Figure 1:
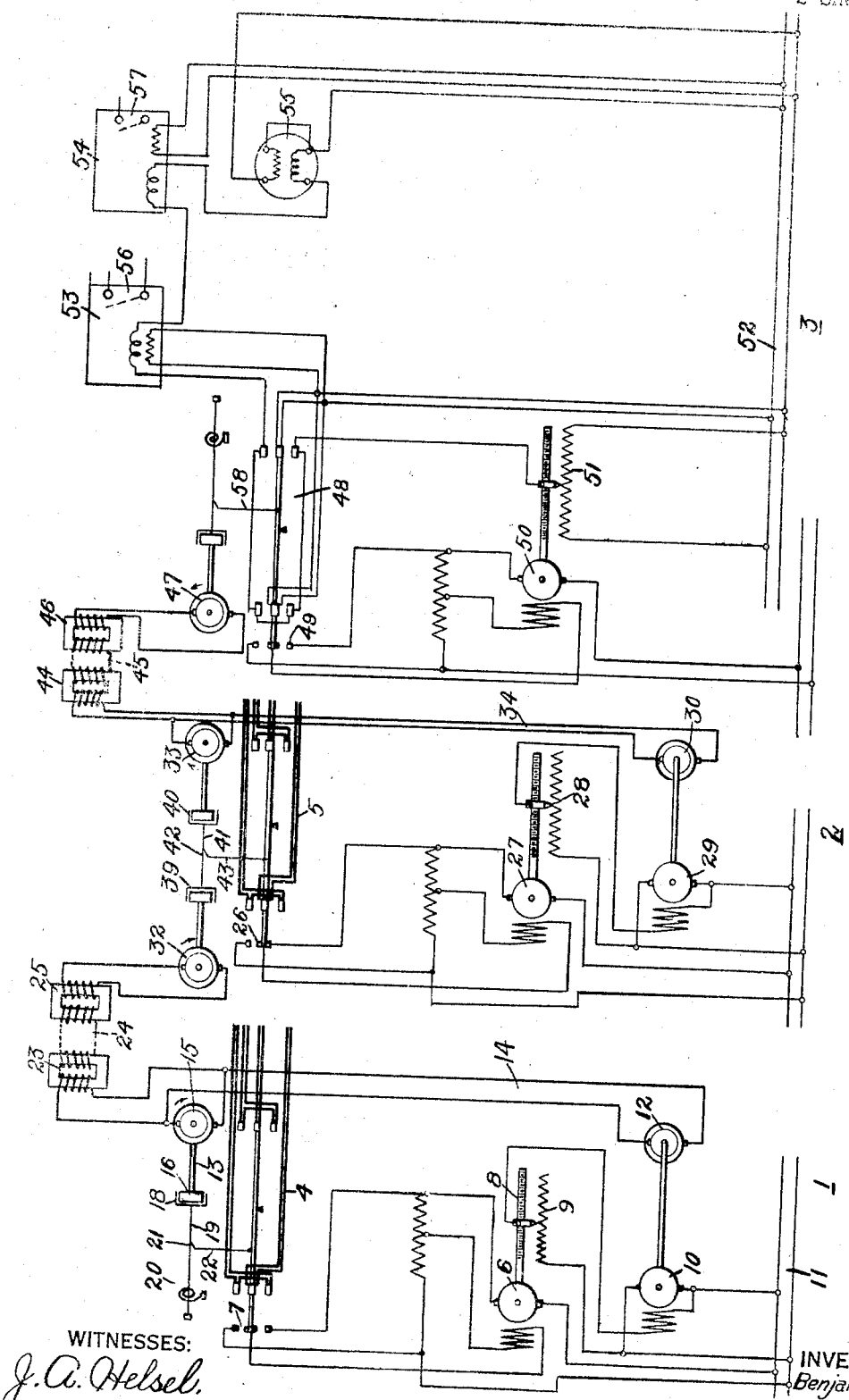

June 30, 1925.

B. H. SMITH 1,543,730

MEASURING SYSTEM

Filed March 8, 1919   2 Sheets-Sheet 1

WITNESSES:
J.A. Helsel.
J.H. Procter

INVENTOR
Benjamin H. Smith.
BY Wesley G. Carr
ATTORNEY

June 30, 1925.  
B. H. SMITH  
MEASURING SYSTEM  
Filed March 8, 1919
1,543,730
2 Sheets-Sheet 2
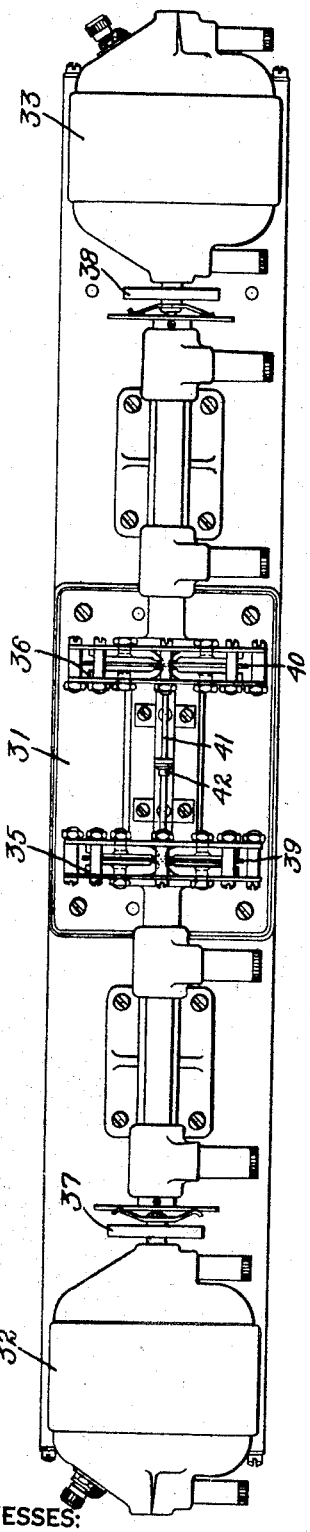
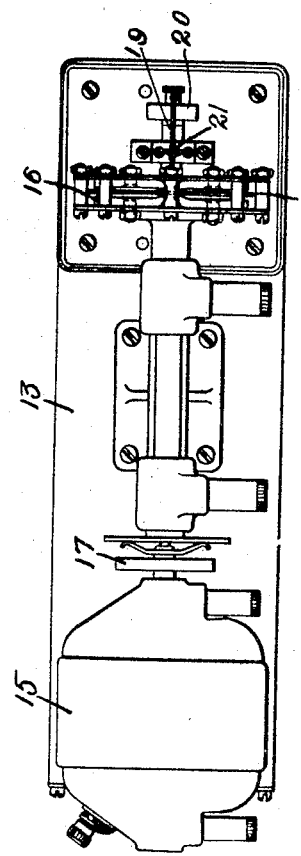
WITNESSES:
J. A. Helsel.
J. H. Procter
INVENTOR
Benjamin H. Smith.
BY
Wesley G. Carr
ATTORNEY Patented June 30, 1925.

1,543,730

UNITED STATES PATENT OFFICE.

BENJAMIN H. SMITH, OF TURTLE CREEK, PENNSYLVANIA, ASSIGNOR TO WESTINGHOUSE ELECTRIC & MANUFACTURING COMPANY, A CORPORATION OF PENNSYLVANIA.

MEASURING SYSTEM.

Application filed March 8, 1919. Serial No. 281,529.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Measuring Systems, of which the following is a specification.

My invention relates to measuring systems and particularly to means for summating the various increments of power supplied to a circuit at a plurality of widely separated points.

One object of my invention is to provide a summating measuring system, of the above indicated character, that shall be simple and inexpensive to construct.

A further object of my invention is to provide a simple and efficient controlling device for a system of the above indicated character that shall be effective under all conditions of operation.

Patent No. 1,513,232, issued October 28, 1924, on a copending application filed by R. D. Evans and assigned to the Westinghouse Electric & Mfg. Co. discloses a measuring system wherein the frequencies of electromotive forces generated at several points are summated to serve as an indication of the power supplied to a circuit at the several points.

In order to simplify such a system and permit the use of single-phase pilot conductors between the stations, I provide a relatively simple controlling device for the various measuring instruments that is adapted to so control the same that no correction for the base or original frequency need be applied, and the system, as a whole, may be rendered more effective in its operation.

In practicing my invention, I provide a plurality of Kelvin balances for measuring the power supplied to the system at the various points. Alternating-current generators are actuated to generate electromotive forces having frequencies proportional to the indications of the respective balances and synchronous motors are so flexibly connected between the generators and the balances that the successive balances indicate the summation of the indications of the preceding balances.

In the accompanying drawings, Fig. 1 is a diagrammatic view of a measuring system embodying my invention. Fig. 2 is a front elevational view of one of the controlling devices embodying my invention, and Fig. 3 is a front elevational view of another controlling device embodying my invention.

Energy is supplied to a transmission circuit (not shown) at widely distributed substations 1 and 2, which energy is to be measured at a dispatcher's station 3 that also is widely separated from the substations 1 and 2. Kelvin balances 4 and 5 are provided at the respective substations 1 and 2 for indicating the power supplied to the system at these points.

The substation 1 comprises, besides the balance 4, a motor 6 that is controlled by the contact member 7 of the balance 4. The motor 6 actuates the contact member 8 of a resistor 9 that is so connected to a motor 10 as to cause the latter to be actuated at a speed proportional to the power indicated by the balance 4. The motor 10 is supplied with energy from a direct-current circuit 11 and is adapted to actuate an alternating-current generator 12. That is, the generator 12 is actuated at a speed proportional to the power indicated by the balance 4 and, consequently, generates an electromotive force the frequency of which is a measure of the power indicated by the balance 4. A controlling device 13, shown in detail in Fig. 3 of the drawings, is operatively connected to the circuit 14 of the generator 12 for the purpose of controlling the balance 4.

The controlling device 13 comprises a synchronous motor 15 that is connected across the circuit 14 and a system of rotatable permanent magnets 16 that are connected through a spring 17 to the motor 15. A disk armature 18 and a spring 20 are mounted on a shaft 19 upon which a lever arm 21 is also mounted and connected through a flexible member 22 to the balance 4.

The motor 15 is adapted to operate in synchronism with the generator 12 and thus cause the flexible member 22 to exert a controlling torque on the balance 4 that is proportional to the power being measured. In other words, in this instance, the controlling device 13 is similar in purpose to the controlling device employed on ordinary Kelvin balances.

The circuit 14 is operatively connected to a transformer 23 which, through a pilot circuit 24, is connected to a transformer 25.

The balance 5 in the substation 2 is provided with contact members 26 that, through a motor 27, controls the resistor 28 in the circuit of a motor 29. The motor 29 actuates an alternating-current generator 30 in accordance with the indications of the balance 5, similar to the device shown in the substation 1.

The balance 5 is provided with a controlling device 31, shown in detail in Fig. 2 of the drawings, that comprises two synchronous motors 32 and 33, the motor 32 of which is operatively connected to the transformer 25 and the motor 33 of which is operatively connected to the circuit 34 of the generator 30. The motor 32 actuates permanent magnets 35, and the motor 33 actuates permanent magnets 36 through spring connections 37 and 38, respectively. Two disk armatures 39 and 40 are mounted on a shaft 41 upon which a lever arm 42 is also mounted. The lever arm 42 is operatively connected, through a flexible member 43, to the balance 5. With this arrangement, the two motors 32 and 33 oppose each other in their actions on the shaft 41 whereby the balance 5 is so controlled that it indicates the sum of the power being supplied to the system at the substation 2 and that indicated by the balance 4.

In order to indicate this summation of power at a distant station 3, the circuit 34 is connected, through transformers 44, pilot circuit 45 and a transformer 46, to a synchronous motor 47 similar to the synchronous motor 15 shown in Fig. 3 of the drawings. A balance 48 is provided at the station 3 and, through its contact members 49, controls a motor 50 which, through a potential regulator 51, controls the current traversing an alternating-current circuit 52. The balance 48 is connected to the circuit 52, and the respective current and potential coils thereof are connected in circuit with the respective current and potential coils of meters 53, 54 and 55. That is, any number of different types of wattmeters may be used to record the watthours, the maximum demand of the system or for regulating the system in accordance with the desired conditions. In other words, the meters 53 and 54 may be provided with contact members 56 and 57 for controlling the various circuits that supply energy to the system.

The motor 47 is actuated at a speed that is proportional to the summation of the frequencies generated by the generators 12 and 30, or, in other words, proportional to the sum of the power values indicated by the balances 4 and 5, whereby the flexible connection 58 so controls the balance 48 that the latter indicates the summation of the power supplied to the system.

While only two substations are shown and described, it will be understood that this system may be applied to any number of substations by providing, in each of the additional stations, apparatus similar to that employed in the substation 2.

My invention is not limited to the particular form of apparatus illustrated, as it may be variously modified without departing from the spirit and scope of the invention, as set forth in the appended claims.

I claim as my invention:

1. In a measuring system, the combination with a plurality of wattmeters, of means comprising alternating-current dynamos actuated at speeds proportional to the indications of the respective wattmeters, and means actuated in proportion to the speeds of the dynamos for controlling the wattmeters.

2. In a measuring system, the combination with a plurality of Kelvin balances, of a plurality of generators, means for actuating the generators in proportion to the indications of the respective balances, and means operatively connected to the generators for controlling the balances.

3. In a measuring system, the combination with a plurality of Kelvin balances, of a plurality of generators, means for actuating the generators in proportion to the indications of the respective balances, and means electrically connected to the generators for controlling the balances.

4. In a measuring system, the combination with a plurality of meters, and means comprising generators actuated in proportion to the indications of the respective meters, of means for co-operating with the generators for controlling certain of the meters in proportion to their indications and other meters in proportion to the difference of the indications of adjacent meters.

5. In a distributing system, the combination with a plurality of feeder circuits and a Kelvin balance for each circuit, of means comprising generators actuated in proportion to the indications of the respective balances, means connected to the first generator for controlling the first balance, and means connected to the first and second generators for controlling the next balance.

6. In a distributing system, the combination with a plurality of feeder circuits and a Kelvin balance for each circuit, of means comprising generators actuated to generate electromotive forces having frequencies that vary in proportion to the indications of the respective balances, means responsive to the frequency of the electromotive force generated by the first generator for controlling the first balance, and means responsive to the difference of the frequencies of the electromotive forces generated by the first and the second generators for controlling the second balance.

power measured by the measuring device, a second frequency-responsive means responsive to the frequency of the generated electromotive force and means for causing the frequency of the generated electromotive force to bear a relation to the frequency of the voltage of the external circuit that varies with the power measured.

31. The combination with two independent dynamo electric machines for generating alternating electromotive forces, of means responsive to the frequencies of the respective electromotive forces for controlling the frequency of one of such forces.

32. A control device comprising a shaft, two disc armature members disposed thereon, two frequency-responsive means for producing the effect of a rotating magnetic field upon the respective disc members, and a wattmeter having its movable element connected to the shaft.

33. A control device comprising a shaft, two disc armature members disposed thereon, frequency-responsive means associated with the respective disc members, means controlled by the frequency-responsive means for producing a rotating-magnetic-field effect on the disc members, and a balance device controlled by the shaft and operative to control one of the frequency-responsive means.

34. A control device comprising a shaft, two disc armature members disposed thereon, frequency-responsive means associated with the respective disc members, means controlled by the frequency-responsive means for producing a moving magnetic field tending to move the disc members, and a Kelvin balance for controlling one of the frequency-responsive means in accordance with the resultant effective force impressed on the shaft.

35. A measuring system for summing two quantities comprising means for developing a force proportional to one quantity, means for developing a force proportional to the second quantity, means for producing a torque differentially effective relative to the forces of the first two means, a balance device for modifying the force developed by one of said means in accordance with said differential torque, and means for measuring the modified force.

36. A measuring system for summing two quantities comprising means for developing a force proportional to one quantity, means for developing a force proportional to the second quantity, means for producing a torque differentially effective relative to the forces of the first two means, means responsive to the unbalance between said forces for modifying the force developed by one of said force-developing means, and means for measuring the modified force.

In testimony whereof, I have hereunto subscribed my name this 28th day of Feb. 1919.

BENJAMIN H. SMITH.